(12) United States Patent
Wang et al.

(10) Patent No.: US 10,069,590 B1
(45) Date of Patent: Sep. 4, 2018

(54) METHODS AND APPARATUS FOR ADAPTIVE COMPENSATION OF SIGNAL BANDWIDTH NARROWING THROUGH FINITE IMPULSE RESPONSE FILTERS

(71) Applicant: Juniper Networks, Inc., Sunnyvale, CA (US)

(72) Inventors: Qiang Wang, Union City, CA (US); Yang Yue, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/395,753

(22) Filed: Dec. 30, 2016

(51) Int. Cl.
*H04J 14/00* (2006.01)
*H04J 14/02* (2006.01)
*H04B 10/58* (2013.01)
*H04B 10/61* (2013.01)

(52) U.S. Cl.
CPC .......... *H04J 14/021* (2013.01); *H04B 10/58* (2013.01); *H04B 10/612* (2013.01)

(58) Field of Classification Search
CPC ............ H03M 3/454; H04B 7/15542; H04B 7/15571; H04B 7/15585
USPC ............................................ 398/85
See application file for complete search history.

(56) References Cited

U.S. PATENT DOCUMENTS

| 8,542,999 | B2 | 9/2013 | Barnard et al. | |
|---|---|---|---|---|
| 8,982,995 | B1* | 3/2015 | Van Cai | H04B 1/0475 375/297 |
| 9,258,022 | B2* | 2/2016 | Kim | H04B 1/0475 |
| 2010/0330929 | A1* | 12/2010 | Heutmaker | H04B 1/30 455/73 |
| 2015/0146769 | A1* | 5/2015 | Omer | H04L 25/03159 375/232 |
| 2016/0020857 | A1 | 1/2016 | Jia et al. | |
| 2016/0065147 | A1* | 3/2016 | Pratt | H03F 1/3247 330/75 |

OTHER PUBLICATIONS

Filer, M. et al., "N-degree ROADM Architecture Comparison: Broadcast-and-Select versus Route-and-Select in 120 Gb/s DP-QPSK Transmission Systems," Optical Fiber Communications Conference and Exhibition (OFG), 2014.
Jia, Z. et al., "Performance comparison of spectrum-narrowing equalizations with maximum likelihood sequence estimation and soft-decision output," Optics Express, vol. 22, No. 5, Mar. 10, 2014.
Zhang, J. et al., "Time-domain digital pre-equalization for band-limited signals based on receiver-side adaptive equalizers," Optics Express, vol. 22, No. 17, Aug. 25, 2014.
Wang, Q. et al., "Adaptive Compensation of Signal Bandwidth Narrowing through Post-ADC Finite Impulse Response Filters," Advanced Photonics Congress, 2016.

* cited by examiner

*Primary Examiner* — Don N Vo
(74) *Attorney, Agent, or Firm* — Cooley LLP

(57) ABSTRACT

An apparatus includes a finite impulse response (FIR) filter to receive a digital signal and a transmitter, operatively coupled to the FIR filter, to transmit an analog signal, converted from the digital signal, to a communication channel. The FIR filer is configured to change at least one operating parameter based on a bandwidth of the analog signal after transmission in the communication channel. The bandwidth of the analog signal is estimated, using an estimator, based at least in part on raw sampling data generated by an analog-to-digital converter (ADC) operatively coupled to the transmitter.

20 Claims, 16 Drawing Sheets

US 10,069,590 B1

METHODS AND APPARATUS FOR ADAPTIVE COMPENSATION OF SIGNAL BANDWIDTH NARROWING THROUGH FINITE IMPULSE RESPONSE FILTERS

FIELD

One or more embodiments relate to methods and apparatus of compensating signal bandwidth narrowing in optical communication systems.

BACKGROUND

Coherent line-cards using polarization-multiplexed quadrature phase-shift keying (PM-QPSK) or polarization-multiplexed quadrature amplitude modulation (PM-QAM) has become de-facto standards in quest for high spectral efficiency optical fiber communications systems. When a modulated signal passes through multiple reconfigurable optical add drop multiplexers (ROADMs), the bandwidth of the propagating signal usually narrows down due to the spectral shape of the ROADM filter and due to possible misalignments of the central frequencies of the signal and the ROADM pass-band. This bandwidth narrowing can in turn increase the observed bit error ratio (BER) at the receiving end and cause the receiver to lose track of the signal. Most dynamic gain equalizers (DGEs) can also introduce bandwidth narrowing by flattening the gain spectrum of cascaded Erbium-doped fiber amplifiers (EDFAs). The bandwidth narrowing effect due to ROADMs and DGEs is relatively dynamic.

In addition, photodiode, trans-impedance amplifier, circuit traces, connector for pluggable optics, and analog digital converters (ADCs) form an analog interface between coherent receiver and digital signal processing (DSP) chip. There is also a similar analog interface between the DSP chip and the coherent transmitter. Both analog interfaces can influence the signal bandwidth. Although this influence can be relatively static, it might degrade over the lifetime. Accordingly, a need exists for methods and apparatus that compensate for the bandwidth narrowing effect.

SUMMARY

Some embodiments described herein relate generally to compensation for bandwidth narrowing, and, in particular, to methods and apparatus for adaptive compensation of signal bandwidth narrowing in fiber communication systems using finite impulse response (FIR) filters.

In some embodiments, an apparatus includes a finite impulse response (FIR) filter to receive a digital signal and a transmitter, operatively coupled to the FIR filter, to transmit an analog signal, converted from the digital signal, to a communication channel. The FIR filer is configured to change at least one operating parameter based on a bandwidth of the analog signal after transmission in the communication channel. The bandwidth of the analog signal is estimated, using an estimator, based at least in part on raw sampling data generated by an analog-to-digital converter (ADC) operatively coupled to the transmitter.

In some embodiments, a method includes transmitting a digital signal through a finite impulse response (FIR) filter converting the digital signal, after the FIR filter, into an analog signal. The method also includes transmitting the analog signal to a communication channel using a transmitter changing at least one operating parameter of the FIR filter based on a bandwidth of the analog signal after transmission in the communication channel. The bandwidth is estimated, using an estimator, based at least in part on raw sampling data generated by an analog-to-digital converter (ADC) operatively coupled to the transmitter.

In some embodiments, a bi-directional link includes a first FIR filter to receive a digital signal and a digital-to-analog converter (DAC), operatively coupled to the first FIR filter, to convert the digital signal to an analog signal. The bi-directional link also includes a transmitter, operatively coupled to the DAC, to transmit the analog signal to a communication channel. A receiver is operatively coupled to the transmitter, to receive the analog signal after the communication channel. An ADC is operatively coupled to the receiver to generate raw sampling data representative of the analog signal. The bi-directional link also includes an estimator, operatively coupled to the ADC and the first FIR filter, to estimate a bandwidth of the analog signal based at least in part on the raw sampling data and a second FIR filter operatively coupled to the ADC and the estimator. The first FIR filter and the second FIR filter are configured to decrease a peaking frequency and a peaking amplitude the first FIR filter and the second FIR filter in response to the bandwidth of the analog signal greater than a predetermined value.

DETAILED DESCRIPTION

In some embodiments, an apparatus includes a finite impulse response (FIR) filter to receive a digital signal and a transmitter, operatively coupled to the FIR filter, to transmit an analog signal, converted from the digital signal, to a communication channel. The FIR filter is configured to change at least one operating parameter based on a bandwidth of the analog signal after transmission in the communication channel so as to proactively compensate for signal bandwidth narrowing in the communication channel. The bandwidth of the analog signal is estimated, using an estimator, based at least in part on raw sampling data generated by an analog-to-digital converter (ADC) operatively coupled to the transmitter.

In some embodiments, the ADC is disposed on the receiver end to generate the raw sampling date representative of the bandwidth of the analog signal. In some embodiments, the ADC can be the ADC already integrated in digital signal processing (DSP) chips. In this case, the apparatus takes advantage of existing hardware in current communication systems to adaptively control the bandwidth of signals.

In some embodiments, the FIR filter compensates for the signal bandwidth narrowing by changing its peak frequency and/or peak amplitude. In some embodiments, the FIR filter decreases at least one of the peaking frequency or the peaking amplitude in response to the bandwidth of the analog signal greater than a predetermined value. In some embodiments, the FIR filter increases at least one of the peaking frequency or the peaking amplitude in response to the bandwidth of the analog signal smaller than a predetermined value.

The apparatus can be implemented in various communication systems. In some embodiments, the apparatus can be employed in a bi-directional communication system, in which the bandwidth of the analog signal can be directly fed to the FIR included in the same bi-directional transceiver that includes the ADC. In some embodiments, the FIR is configured to receive, via an in-band signal, a control signal based on the bandwidth of the analog signal to change the at least one operating parameter. In some embodiments, the FIR filter is configured to receive, via a network management device, a control signal based on the bandwidth of the analog signal to change the at least one operating parameter.

In some embodiments, a method includes transmitting a digital signal through a finite impulse response (FIR) filter converting the digital signal, after the FIR filter, into an analog signal. The method also includes transmitting the analog signal to a communication channel using a transmitter changing at least one operating parameter of the FIR filter based on a bandwidth of the analog signal after transmission in the communication channel. The bandwidth is estimated, using an estimator, based at least in part on raw sampling data generated by an analog-to-digital converter (ADC) operatively coupled to the transmitter.

Figure 1:
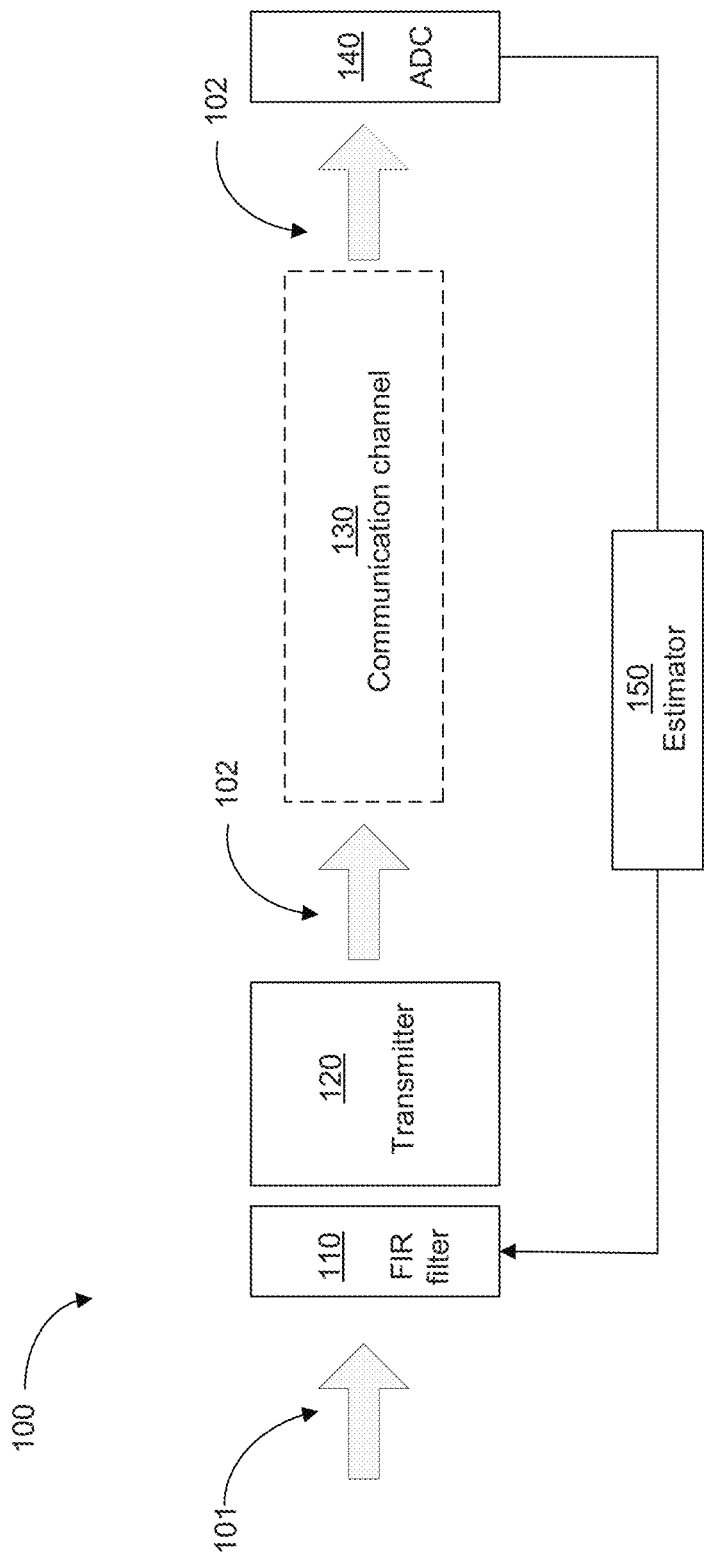
FIG. 1 shows a schematic of an apparatus for adaptive compensation of signal bandwidth narrowing in a communication system, according to embodiments.

FIG. 1 shows a schematic of an apparatus 100 for adaptive compensation of signal bandwidth narrowing in a communication system, according to embodiments. The apparatus 100 includes a FIR filter 110 to receive a digital signal 101 and a transmitter 120, operatively coupled to the FIR filter 110, to transmit an analog signal 102 (e.g., an optical signal), converted from the digital signal 101, to a communication channel 130. The communication channel 130 can include ROADMs or other components that can cause bandwidth narrowing of the analog signal 102. After the communication channel 130, the analog channel 102 is received by an ADC 140, which converts the analog signal 102 back into a digital signal. During the conversion, the ADC 140 generates raw sampling data that can be representative of the spectrum of the analog signal 102. For example, an 8-bit ADC can generate raw sampling data that represents values between −128 to 127 and is proportional to the analog signal 102.

An estimator 150 is operatively coupled to the ADC and the FIR filter 110 (thereby operatively coupled to the transmitter 120 as well) to receive the raw sampling data from the ADC 140 and estimate the bandwidth of the analog signal 102 based on the raw sampling data. The FIR filter 110 is configured to change at least one operating parameter based on the bandwidth of the analog signal 102 after transmission in the communication channel 130. This change of operating parameter of the FIR filter 110 can compensate for bandwidth narrowing that occurs in the communication channel 130. Because the digital signal 101 is transmitted through the FIR filter 110 before being converted into the analog signal 102 and transmitted through the communication channel, this compensation is also referred to as pre-compensation, or transmitter-end compensation. Since the compensation is based on only raw sampling data from the ADC 140, this technique does not require DSP lock or recovery of the digital signal. This can be especially advantageous when the communication channel 130 introduces significant amount of narrowing to the analog signal 102 such that recovering the digital signal from the analog signal 102 can be challenging.

In some embodiments, the FIR filter 110 and the ADC 140 are built in a DSP chip and the parameters of the FIR filter 110 can be controlled by adjusting registers within the DSP chip. At the same time, a short size of the raw sampling data of the ADC 140 can be stored in the on-chip memory of the DSP chip. The estimator 150 can include a controller (not shown in FIG. 1) to extract the raw sampling data from the DSP chip, estimate the bandwidth, and then configure FIR filter 110 accordingly.

The FIR filter 110 can change at least one of the peaking frequency, the peaking amplitude, and/or the roll-off factor to compensate for the bandwidth narrowing of the analog signal 102. In general, the shape of the FIR filter 110 can be inversely proportional to the analog signal 102 for compensation purposes.

In some embodiments, the FIR filter 110 can change its peaking frequency based on the bandwidth information received from the estimator 150. For example, the FIR filter 110 can decrease the peaking frequency in response to the bandwidth of the analog signal 102 greater than a predetermined value. Alternatively, the FIR filter 110 can increase the peaking frequency in response to the bandwidth of the analog signal 102 less than a predetermined value. In other words, the FIR filter 110 adjusts its peaking frequency based on absolute values of the bandwidth of the analog signal 102. In some embodiments, the predetermined value can be about 10 GHz to about 30 GHz (e.g., about 10 GHz, about 15 GHz, about 20 GHz, about 25 GHz, or about 30 GHz, including any values and sub ranges in between).

In some embodiments, the FIR filter 110 can change its peaking frequency based on the change of the bandwidth of the analog signal 102. For example, the estimator 150 can monitor the bandwidth of the analog signal 102 in a substantially real-time manner. The measurement of the bandwidth can be performed at an acquisition frequency substantially equal to or greater than 10 Hz (e.g., about 10 Hz, about 15 Hz, about 20 Hz, about 30 Hz, about 50 Hz, or greater, including any values and sub ranges in between). In response to a decrease of the detected bandwidth, the FIR filter 110 can increase its peaking frequency. In response to an increase of the detected bandwidth, the FIR filter 110 can decrease its peaking frequency. Stated differently, the FIR filter 110 adjusts the peaking frequency based on a relative change of the bandwidth of the analog signal 102.

The peaking frequency of the FIR filter 110 can be changed within a range up to the Nyquist frequency of the analog signal 102. In some embodiments, the peaking frequency of the FIR filter 110 can be about 10% to about 100% of the Nyquist frequency of the analog signal (e.g., about 10%, about 20%, about 30%, about 40%, about 50%, about 60%, about 70%, about 80%, about 90%, about 95%, about 99%, or about 100%, including any values and sub ranges in between).

In some embodiments, the FIR filter 110 can change its peaking amplitude based on the bandwidth information received from the estimator 150. For example, the FIR filter 110 can decrease the peaking amplitude in response to the bandwidth of the analog signal 102 greater than a predetermined value. Alternatively, the FIR filter 110 can increase the peaking amplitude in response to the bandwidth of the analog signal 102 less than a predetermined value. In other words, the FIR filter 110 adjusts its peaking amplitude based on absolute values of the bandwidth of the analog signal 102. In some embodiments, the predetermined value of the bandwidth can be about 10 GHz to about 30 GHz (e.g., about 10 GHz, about 15 GHz, about 20 GHz, about 25 GHz, or about 30 GHz, including any values and sub ranges in between).

In some embodiments, the FIR filter 110 can change its peaking amplitude based on the change of the bandwidth of the analog signal 102. For example, the estimator 150 can monitor the bandwidth of the analog signal 102 in a substantially real-time manner. In response to a decrease of the detected bandwidth, the FIR filter 110 can increase its peaking amplitude. In response to an increase of the detected bandwidth, the FIR filter 110 can decrease its peaking amplitude. Stated differently, the FIR filter 110 adjusts the peaking amplitude based on a relative change of the bandwidth of the analog signal 102.

The peaking amplitude of the FIR filter 110 can be changed within a range of about 1 dB to about 9 dB. For example, the peaking amplitude of the FIR filter 110 can be about 1 dB, about 2 dB, about 3 dB, about 4 dB, about 5 dB, about 6 dB, about 7 dB, about 8 dB, or about 9 dB, including any values and sub ranges in between.

In some embodiments, the FIR filter 110 can change its roll-off factor based on the bandwidth information received from the estimator 150. For example, the FIR filter 110 can decrease the roll-off factor in response to the bandwidth of the analog signal 102 less than a predetermined value. Alternatively, the FIR filter 110 can increase the roll-off factor in response to the bandwidth of the analog signal 102 greater than a predetermined value. In other words, the FIR filter 110 adjusts its roll-off factor based on absolute values of the bandwidth of the analog signal 102. In some embodiments, the predetermined value of the bandwidth can be about 10 GHz to about 30 GHz (e.g., about 10 GHz, about 15 GHz, about 20 GHz, about 25 GHz, or about 30 GHz, including any values and sub ranges in between).

In some embodiments, the FIR filter 110 can change its roll-off factor based on the change of the bandwidth of the analog signal 102. For example, the estimator 150 can monitor the bandwidth of the analog signal 102 in a substantially real-time manner. In response to a decrease of the detected bandwidth, the FIR filter 110 can decrease its roll-off factor. In response to an increase of the detected bandwidth, the FIR filter 110 can decrease its roll-off factor. Stated differently, the FIR filter 110 adjusts the roll-off factor based on a relative change of the bandwidth of the analog signal 102.

The roll-off factor of the FIR filter 110 (such as a raise-cosine filter) can be changed within a range of about 0.1 to about 1. For example, the roll-off factor of the FIR filter 110 can be about 0.1, about 0.2, about 0.3, about 0.4, about 0.5, about 0.6, about 0.7, about 0.8, about 0.9, or about 1, including any values and sub ranges in between.

In some embodiments, the FIR filter 110 can change more than one parameter for adaptive compensation. For example, the FIR filter 110 can change both the peaking frequency and the peaking amplitude based on the bandwidth of the analog signal 102. In another example, the FIR filter 110 can change the peaking frequency, the peaking amplitude, and the roll-off factor based on the bandwidth of the analog signal 102.

The transmitter 120 can include one or more types of transmitters. In some embodiments, the transmitter 120 can include a coherent transmitter. In some embodiments, the transmitter 120 can include a C-form pluggable generation (CFP) transmitter. In some embodiments, the transmitter 120 can include a CFP4 transmitter, which can be coherent or non-coherent. In some embodiments, the transmitter 120 can include a C-form pluggable generation 2-analog coherent optics (CFP2-ACO) transmitter that is coupled with a digital signal processor (DSP) chip through a pluggable interface.

In some embodiments, the transmitter 120 can include a coherent in-phase/quadrature transmitter integrated together with a DSP within a physical module. In some embodiments, the transmitter 120 can include a C-form pluggable generation-digital coherent optics (CFP-DCO) transmitter integrated with a DSP and an optical front end. In some embodiments, the transmitter 120 can include a Quad Small Form-factor Pluggable (QSFP) transmitter. In some embodiments, the transmitter 120 can include a QSFP28 transmitter. These transmitters can be coherent or incoherent.

The estimator 150 can estimate the bandwidth of the analog signal 102 based on the raw sampling data of the ADC 140 via various methods. In some embodiments, the estimator 150 is configured to perform a Fourier transform on the raw sampling data to compute the spectrum of the analog signal 102 and then estimate the bandwidth of the analog signal 102. In some embodiments, the Fourier transform can be carried out via fast Fourier transform (FFT) methods or any other digital methods known in the art.

In some embodiments, the estimator 150 is configured to perform digital filtering before estimating the bandwidth of the analog signal. For example, the estimator 150 can be configured to perform Fourier transform of the raw ADC data to generate unfiltered spectrum. Then the estimator 150 performs a digital filtering to the unfiltered spectrum to generate filtered data and estimates the bandwidth of the analog signal based on the filtered data. In some embodiments, the digital filtering can be Savitzky-Golay filtering. In some embodiments, the digital filtering can be moving average filtering, or any other appropriate digital filtering techniques.

The bandwidth information estimated by the estimator 150 can be provided to the FIR filter 110 via various channels. In some embodiments, the FIR filter 110 can be part of a bi-directional link, which also includes the ADC 140. In this case, the bandwidth information estimated from the ADC 140 can be transmitted to the FIR filter 110 (see, e.g. FIG. 3) via, for example, on-chip communication. In some embodiments, the bandwidth information can be transmitted to the FIR filter 110 via a network management device (see, e.g., FIG. 4) via transmission channels outside the module containing the ADC 140 and/or the FIR filter 110. In some embodiments, the bandwidth information can be transmitted to the FIR filter 110 via in-band signals (see, e.g., FIG. 5) within, for example, the DSP chip containing the ADC 140.

In some embodiments, a control signal is first generated based on the bandwidth of the analog signal 102 and then transmitted to the FIR filter 110 to adjust its operating parameters. In some embodiments, the control signal can be generated by the estimator 150 and transmitted to the FIR filter 110 via any of the methods described above (e.g., via network management device, via in-band signal, or via direct transmission). In some embodiments, the control signal can be generated by the DSP chip, into which the FIR filter 110 is integrated.

In some embodiments, the apparatus 100 can include a second FIR filter (not shown in FIG. 1) disposed after the ADC 140 (e.g., on the receiver end). The bandwidth of the analog signal 102 can also be employed to control operating parameters of the second FIR filter, in a manner similar to the control of the FIR filter 110. Using two FIR filters (one on the transmitter end and the other on the receiver end) can further improve the tolerance to signal bandwidth narrowing in the communication channel 130.

In some embodiments, the communication channel 130 includes a fiber communication channel, which in turn includes multiple ROADMs that can introduce bandwidth narrowing to the analog signal 102. In some embodiments, the communication channel 130 can include semiconductor waveguides with directional couplers as add/drop couplers. In some embodiments, the communication channel 130 can include any other type of channels known in the art.

Figure 2:
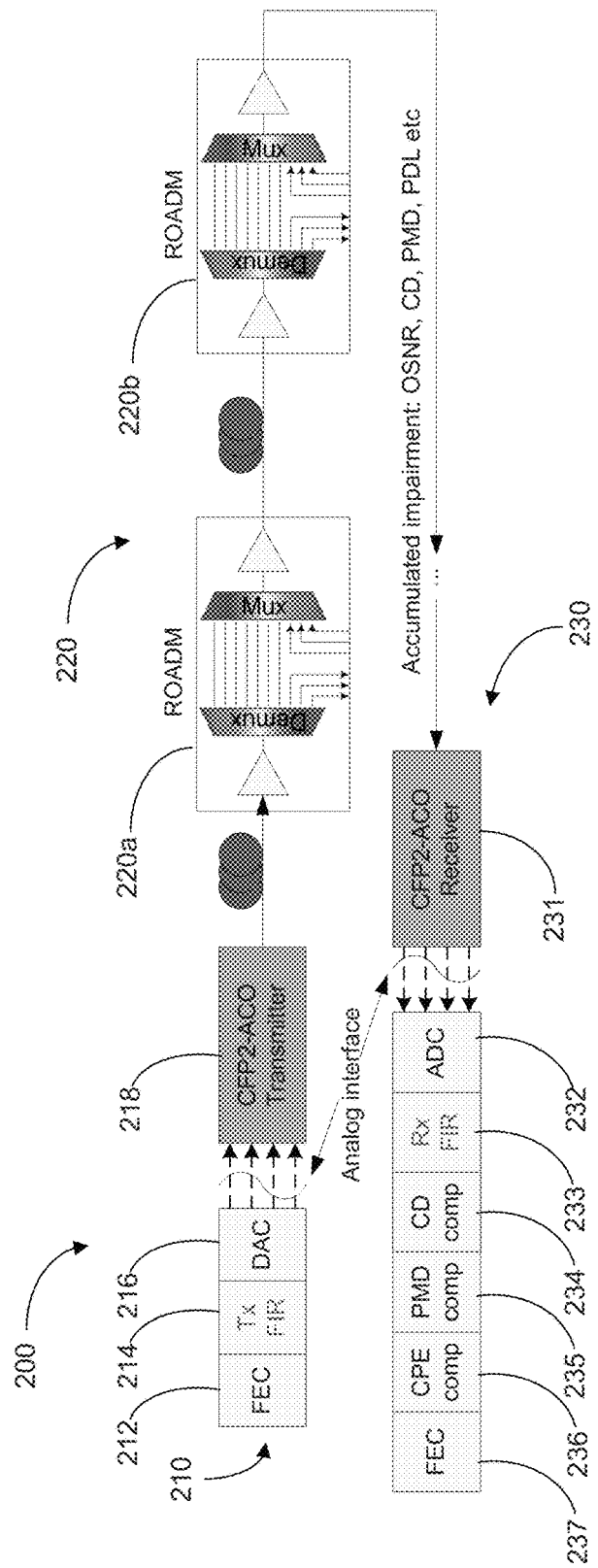
FIG. 2 shows a schematic of a coherent transceiver including finite impulse response (FIR) filters for adaptive compensate of signal bandwidth narrowing, according to embodiments.

FIG. 2 shows a schematic of a coherent transceiver 200 including FIR filters for adaptive compensate of signal bandwidth narrowing, according to embodiments. The transceiver 200 includes a transmitter module 210 to transmit an analog signal into a communication channel 220, and a receiver module 230 to receive the analog signal after transmission in the communication channel 220. The transmitter module 210 further includes a transmitter end forward error correction (FEC) device 212, a transmitter FIR filter 214, a digital-to-analog converter (DAC) 216, and a transmitter 218 (e.g., a CFP2-ACO transmitter). The communication channel 220 includes two groups of ROADMs 220a and 220b, which can introduce bandwidth narrowing to the analog signal propagating in the communication channel 220. The communication channel 220 can also introduce other impairments, such as chromatic dispersion (CD), polarization mode dispersion (PMD), and polarization dependent loss (PDL), among others. The receiver module 230 includes a receiver 231 (e.g., a CFP2-ACO receiver), an ADC 232, a receiver FIR filter 233, a CD compensator 234, a PMD compensator 235, a carrier phase estimation (CPE) compensator 236, and a receiver end FEC device 237.

In operation, the ADC 232 in the receiver module 230 converts the analog signal transmitted through the communication channel 220 into a digital signal. The raw sampling data of the ADC 232 can be used to estimate the spectrum and therefore bandwidth of the analog signal. This bandwidth information can then be employed as the basis to control the transmitter end FIR filter 214 and/or the receiver end FIR filter 233 to adjust their operating parameters, such as peaking frequency, peaking amplitude, and roll-off factor. This change of operating parameter(s) can in turn compensate for the bandwidth narrowing introduced by the communication channel 220, in particular the ROADMs.

Figure 4:
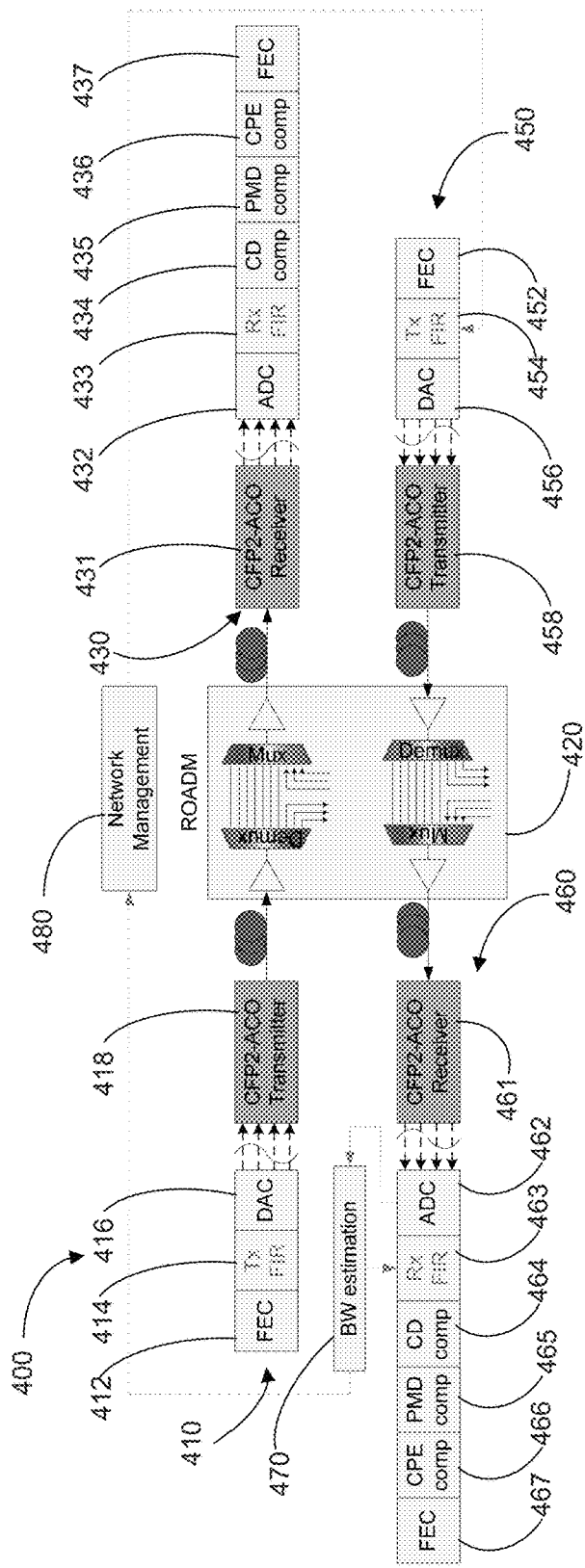
FIG. 4 shows a schematic of system using a network management device to provide bandwidth information for FIR filters to adaptively compensate for signal bandwidth narrowing, according to embodiments.
Figure 5:
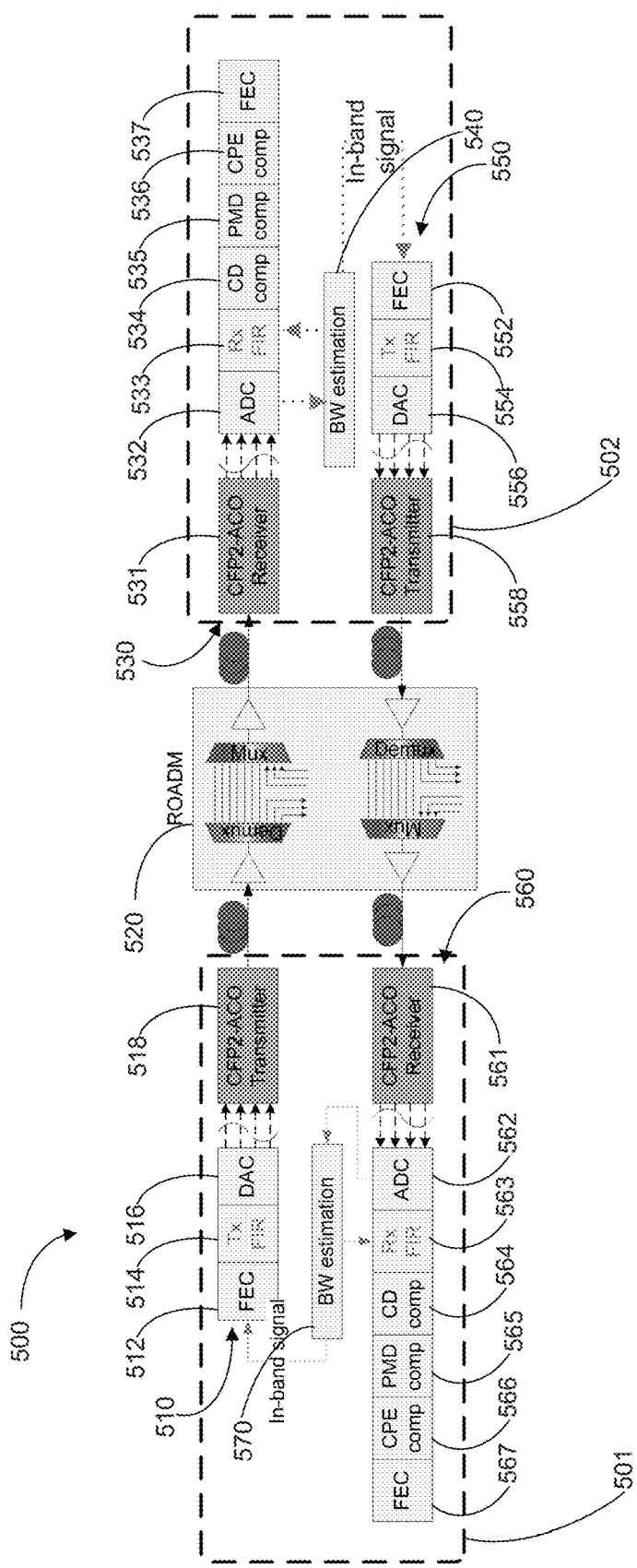
FIG. 5 shows a schematic of a system using in-band signals to provide bandwidth information for FIR filters to adaptively compensate for signal bandwidth narrowing, according to embodiments.

Because the receiver end FIR filter 233 can be generally coupled to the ADC 232 within the same physical module, bandwidth information of the analog signal can be directly transmitted from the ADC 232 (or any estimator coupled to the ADC) to the receiver end FIR filter 233. In contrast, the transmitter end FIR filter 214 may be physically separate or even remote from the ADC 232. Accordingly, the communication between the ADC 232 and the transmitter end FIR filter 214 can be based on the type of transceiver 200. Some illustrative examples of such communication are shown in FIGS. 3-5 and described below.

Figure 3:
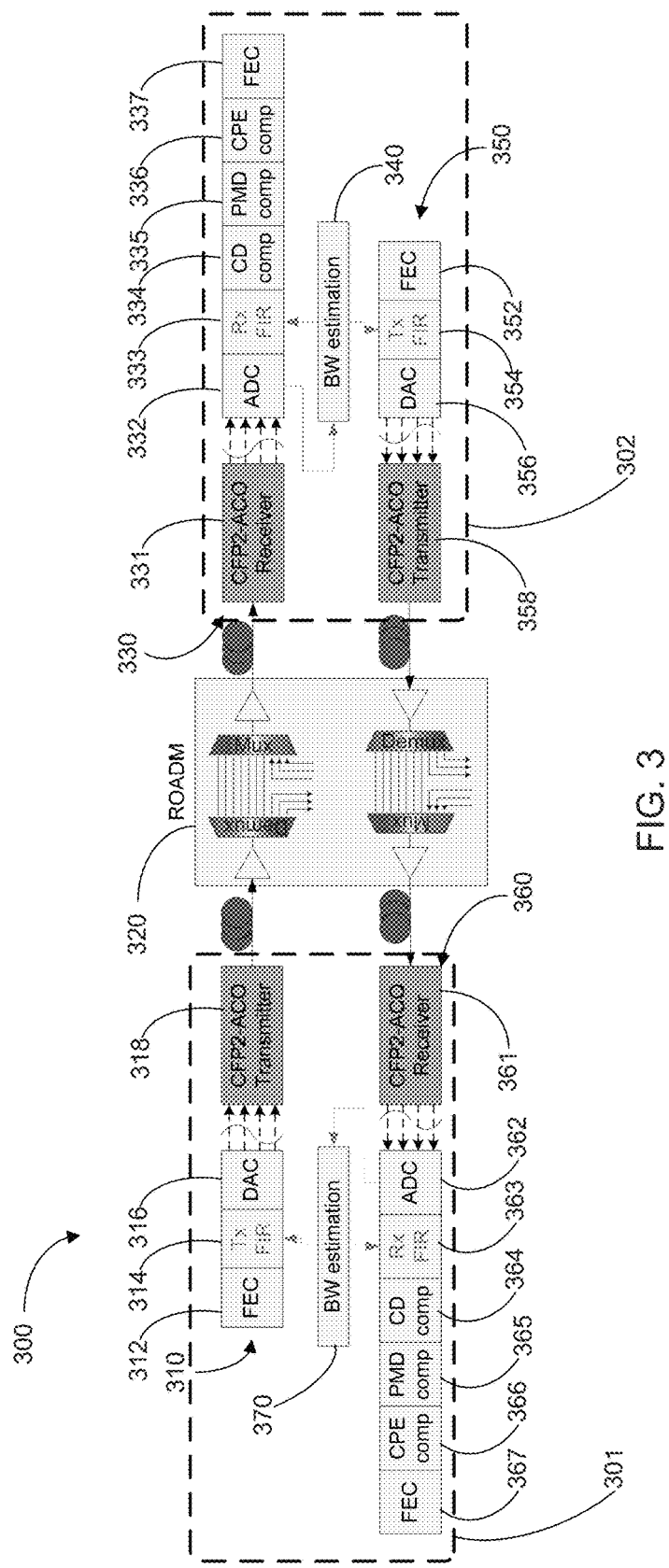
FIG. 3 shows a schematic of a bi-directional coherent transceiver system including FIR filters for adaptive compensation of signal bandwidth narrowing, according to embodiments.

FIG. 3 shows a schematic of a bi-directional coherent transceiver system 300 including FIR filters for adaptive compensation of signal bandwidth narrowing, according to embodiments. The transceiver system 300 includes a first node 301 on the west end (left end) and a second node 302 on the east end (right end) separated by a communication channel 320.

The first node 301 includes a transmitter module 310, a receiver module 360, and a bandwidth estimator 370. The transmitter module 310 includes a transmitter end FEC device 312, a transmitter FIR filter 314, a DAC 316, and a transmitter 318. The receiver module 360 of the first node 301 includes a receiver 361 (e.g., a CFP2-ACO receiver), an ADC 362, a receiver FIR filter 363, a CD compensator 364, a PMD compensator 365, a CPE compensator 366, and a receiver end FEC device 367. The bandwidth estimator 370 is operatively coupled to the ADC 362 to estimate bandwidth of the received analog signal based on raw sampling data generated by the ADC 362. The bandwidth estimator 370 is further operatively coupled to the transmitter FIR filter 314 and the receiver FIR filter 363 so as to control the two FIR filters 314 and 363 for bandwidth narrowing compensation.

The second node 302 can have a substantially similar diagram to the first node 301. The second node 302 also includes a transmitter module 350, a receiver module 330, and a bandwidth estimator 340. The transmitter module 350 further includes a transmitter end FEC device 352, a transmitter FIR filter 354, a DAC 356, and a transmitter 358. The receiver module 330 of the second node 302 includes a receiver 331 (e.g., a CFP2-ACO receiver), an ADC 332, a receiver FIR filter 333, a CD compensator 334, a PMD compensator 335, a CPE compensator 336, and a receiver end FEC device 337. The bandwidth estimator 340 is operatively coupled to the ADC 332 to estimate bandwidth of the received analog signal based on raw sampling data generated by the ADC 332. The bandwidth estimator 340 is further operatively coupled to the transmitter FIR filter 354 and the receiver FIR filter 333 so as to control the two FIR filters 354 and 333 for bandwidth narrowing compensation.

In some embodiments, the communication between the first node 301 and the second node 302 can be bi-directional.

In this case, the transmitter module 310 of the first node 301 is in communication with the receiver module 330 of the second node 302, while the transmitter module 350 of the second node 302 is in communication with the receiver module 360 of the first node 301. The links in both directions include substantially the same number of ROADMs. In addition, the ROADMs in both directions are usually of the same type, from the same vendor, and in the same ambient environment. Therefore, it can be assumed that the effect of bandwidth narrowing in the two directions (i.e., from the first node 301 to the second node 302 and from the second node 302 to the first node 301) is also substantially the same.

With the above assumption, in some embodiments, one can estimate bandwidth from the receiver module 330 in the second node 302, and then use the estimated bandwidth to adjust the transmitter FIR 354 in the same node (i.e., second node 302). This adjustment can improve characteristics of the east-west link (i.e. data transmission from the second node 302 to the first node 301).

In some embodiments, one can estimate bandwidth from the receiver module 360 in the first node 301 and then use the estimated bandwidth to adjust the transmitter FIR 314 in the first node 301. This adjustment can improve characteristics of the west-east link (i.e., data transmission from the first node 301 to the second node 302).

FIG. 4 shows a schematic of system 400 using a network management device to provide bandwidth information for FIR filters to adaptively compensate for signal bandwidth narrowing, according to embodiments. The system 400 includes a first transmitter module 410 and a first receiver module 430 separated by a communication channel 420. The system 400 also includes a second transmitter module 450 and a second receiver module 460 also separated by the communication channel 420. Unlike the bi-directional communication shown in FIG. 3, however, the communication from the first transmitter module 410 to the first receiver module 430 can be different from the communication from the second transmitter module 450 to the second receiver module 460. For example, the communications on these two directions can include different numbers of ROADMs and/or different types of ROADMs. As a result, the bandwidth narrowing effects on these two directions can be different.

The first transmitter module 410 includes a FEC device 412, a transmitter FIR filter 414, a DAC 416, and a transmitter 418. The first receiver module 430 includes a receiver 431 (e.g., a CFP2-ACO receiver), an ADC 432, a receiver FIR filter 433, a CD compensator 434, a PMD compensator 435, a CPE compensator 436, and a receiver-end FEC device 437.

Similarly, the second transmitter module 450 also includes a FEC device 452, a transmitter FIR filter 454, a DAC 456, and a transmitter 458. The second receiver module 460 includes a receiver 461 (e.g., a CFP2-ACO receiver), an ADC 462, a receiver FIR filter 463, a CD compensator 464, a PMD compensator 465, a CPE compensator 466, and a receiver-end FEC device 467.

A bandwidth estimator 470 is operatively coupled to the ADC 462 in the second receiver module 460 to estimate bandwidth of the analog signal transmitted by the second transmitter module 450 and received by the second receiver module 460. The estimated bandwidth is then transmitted to a network management device 480, which in turn transmits the bandwidth information to the transmitter FIR filter 454 to compensate for bandwidth narrowing that occurs in the communication channel from the second transmitter module 450 to the second receiver module 460.

Similarly, another bandwidth estimator (not shown in FIG. 4) can be operatively coupled to the ADC 432 in the first receiver module 430 and estimate the bandwidth of received analog signals. The estimated bandwidth can be then transmitted to the transmitter FIR filter 414 in the first receiver module 410 for bandwidth narrowing compensation via the network management device 480. In this manner, the characteristics of the communication between the first transmitter module 410 and the first receiver module 430 can be improved.

In some embodiments, the estimated bandwidth from the bandwidth estimator 470 can also be provided to the receiver FIR filter 463 in the second receiver module 460. As discussed above, using two FIR filters (one on the transmitter end and the other on the receiver end) can further improve the tolerance to signal bandwidth narrowing in the communication channel 420.

FIG. 5 shows a schematic of a system 500 using in-band signals to provide bandwidth information for FIR filters. The system 500 includes a first node 501 on the west end (left end) and a second node 502 on the east end (right end) separated by a communication channel 520.

The first node 501 includes a transmitter module 510, a receiver module 560, and a bandwidth estimator 570. The transmitter module 510 includes a transmitter end FEC device 512, a transmitter FIR filter 514, a DAC 516, and a transmitter 518. The receiver module 560 of the first node 501 includes a receiver 561 (e.g., a CFP2-ACO receiver), an ADC 562, a receiver FIR filter 563, a CD compensator 564, a PMD compensator 565, a CPE compensator 566, and a receiver end FEC device 567. The bandwidth estimator 570 is operatively coupled to the ADC 562 to estimate bandwidth of the received analog signal based on raw sampling data generated by the ADC 562. The bandwidth estimator 570 is further operatively coupled to the transmitter module 510 via in-band signals.

The second node 502 can have a substantially similar diagram to the first node 501. The second node 502 also includes a transmitter module 550, a receiver module 530, and a bandwidth estimator 540. The transmitter module 550 further includes a transmitter end FEC device 552, a transmitter FIR filter 554, a DAC 556, and a transmitter 558. The receiver module 530 of the second node 502 includes a receiver 531 (e.g., a CFP2-ACO receiver), an ADC 532, a receiver FIR filter 533, a CD compensator 534, a PMD compensator 535, a CPE compensator 536, and a receiver end FEC device 537. The bandwidth estimator 540 is operatively coupled to the ADC 332 to estimate bandwidth of the received analog signal based on raw sampling data generated by the ADC 532. The bandwidth estimator 540 is further operatively coupled to the transmitter module 550 via in-band signals.

In some embodiments, the in-band signals can be embedded in an IP packet(s) in the reverse direction. In some embodiments, the in-band signals can be embedded in optical transport network (OTN) frame in the reverse direction. For example, the receiver module 530 in the second node 502 can estimate the signal bandwidth in west-east direction (i.e., from the first node 501 to the second node 502). This estimated bandwidth can be then sent through the transmitter module 550 in the second node 502, which transmits signals in east-west direction (i.e., from second node 502 to first node 501). Once the first node 501 receives the bandwidth information, it can adaptively adjust the transmitter FIR filter 514 for pre-compensation, which improves the performance of west-east link.

In another example, the receiver module 560 in the first node 501 can estimate the signal bandwidth in east-west direction (i.e., from the second node 502 to the first node 501). This estimated bandwidth can be then sent through the transmitter module 510 in the first node 501, which transmits signals in west-east direction (i.e., from first node 501 to second node 502). Once the second node 502 receives the bandwidth information, it can adaptively adjust the transmitter FIR filter 554 for pre-compensation, which improves the performance of east-west link.

In some embodiments, the estimated bandwidth from the bandwidth estimator 540 can also be provided to the receiver FIR filter 533 in the first receiver module 530. As discussed above, using two FIR filters (one on the transmitter end and the other on the receiver end) can further improve the tolerance to signal bandwidth narrowing in the communication channel 520.

Similarly, in some embodiments, the estimated bandwidth from the bandwidth estimator 570 can also be provided to the receiver FIR filter 563 in the second receiver module 560. As discussed above, using two FIR filters (one on the transmitter end and the other on the receiver end) can further improve the tolerance to signal bandwidth narrowing in the communication channel 520.

Figure 6:
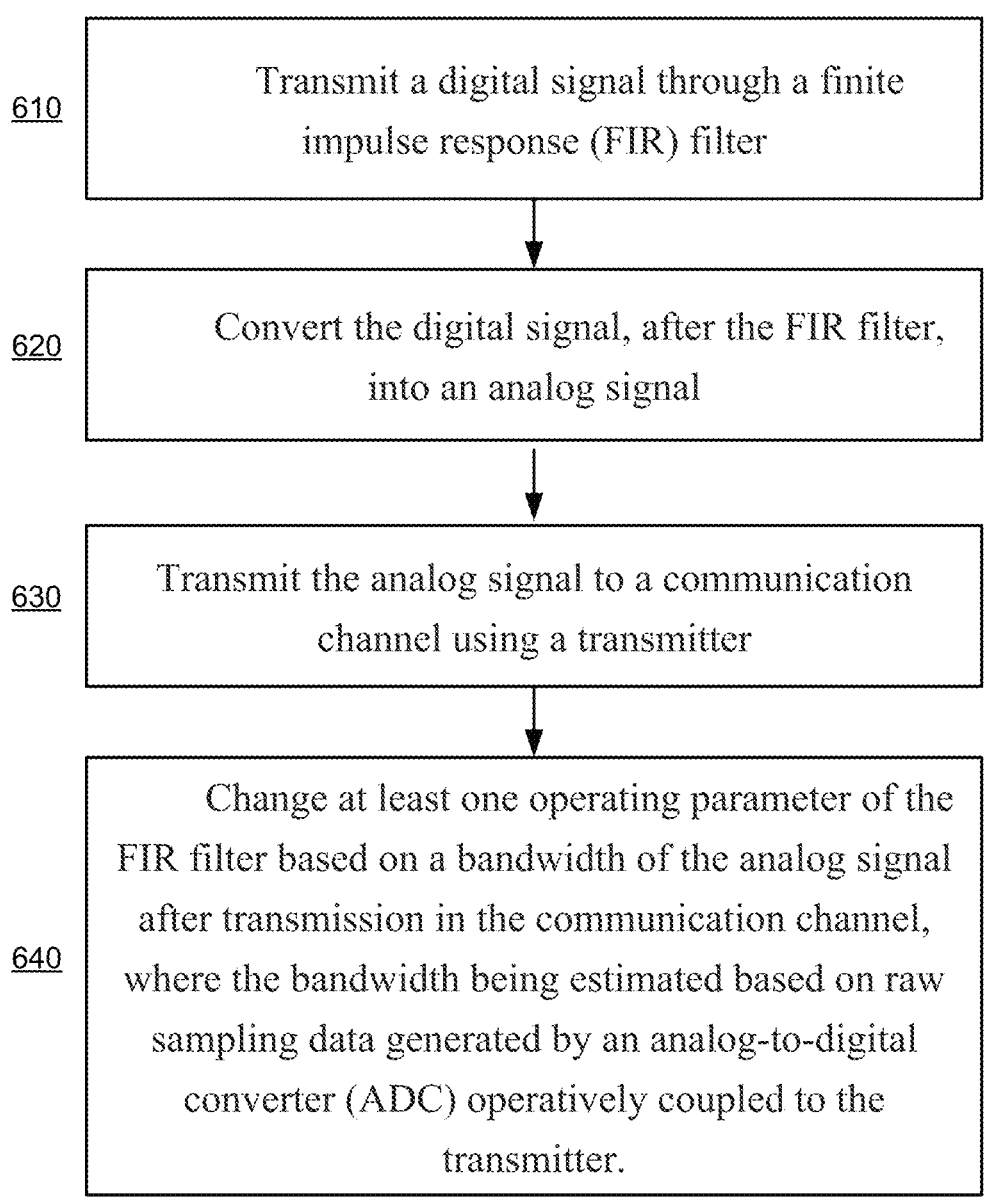
FIG. 6 illustrates a method of adaptive compensation for signal bandwidth narrowing using FIR filters in a communication system, according to embodiments.

FIG. 6 illustrates a method 600 of adaptive compensation for signal bandwidth narrowing using FIR filters in a communication system, according to embodiments. The method 600 includes transmitting a digital signal through a finite impulse response (FIR) filter at step 610. The digital signal is then converted into an analog signal after the FIR filter, at step 620. At step 630, the analog signal is transmitted to a communication channel using a transmitter. The method 600 also includes changing at least one operating parameter of the FIR filter based on the bandwidth of the analog signal after transmission in the communication channel at step 640. The bandwidth of the analog signal is estimated, using an estimator, based at least in part on raw sampling data generated by an analog-to-digital converter (ADC) operatively coupled to the transmitter.

In some embodiments, the FIR filter changes at least one of the peaking frequency, the peaking amplitude, or the roll-off factor so as to compensate for bandwidth narrowing in the communication channel. In some embodiments, the FIR filter decreases the peaking frequency in response to the bandwidth of the analog signal greater than a predetermined value. In some embodiments, the FIR filter increases the peaking frequency in response to the bandwidth of the analog signal smaller than a predetermined value.

In some embodiments, the FIR filter decreases the peaking amplitude in response to the bandwidth of the analog signal greater than a predetermined value. In some embodiments, the FIR filter increases the peaking amplitude in response to the bandwidth of the analog signal smaller than a predetermined value.

In some embodiments, the FIR filter decreases the roll-off factor in response to the bandwidth of the analog signal less than a predetermined value. In some embodiments, the FIR filter increases the roll-off factor in response to the bandwidth of the analog signal greater than a predetermined value.

In some embodiments, the FIR filter decreases the peaking frequency in response to an increase of the bandwidth of the analog signal. In some embodiments, the FIR filter increases the peaking frequency in response to a decrease of the bandwidth of the analog signal.

In some embodiments, the FIR filter decreases the peaking amplitude in response to an increase of the bandwidth of the analog signal. In some embodiments, the FIR filter increases the peaking amplitude in response to a decrease of the bandwidth of the analog signal.

In some embodiments, the FIR filter decreases the roll-off factor in response to a decrease of the bandwidth of the analog signal. In some embodiments, the FIR filter increases the roll-off factor in response to an increase of the bandwidth of the analog signal.

In some embodiments, the estimator estimates the bandwidth of the analog signal by performing Fourier transform of the raw ADC data to generate unfiltered spectrum. The estimator then performs digital filtering to the unfiltered spectrum to generate filtered data and estimate the bandwidth of the analog signal based on the filtered data.

In some embodiments, the digital filtering includes Savitzky-Golay filtering. In some embodiments, the digital filtering includes moving average filtering to the unfiltered spectrum to generate filtered data.

In some embodiments, the FIR filter receives the bandwidth information via a network management device. In some embodiments, the FIR filter receives the bandwidth information via an in-band signal. In some embodiments, the FIR filter and the ADC are included in the same module (e.g., a DSP chip) and the FIR filter receives the bandwidth information from on-chip communication.

Figure 7:
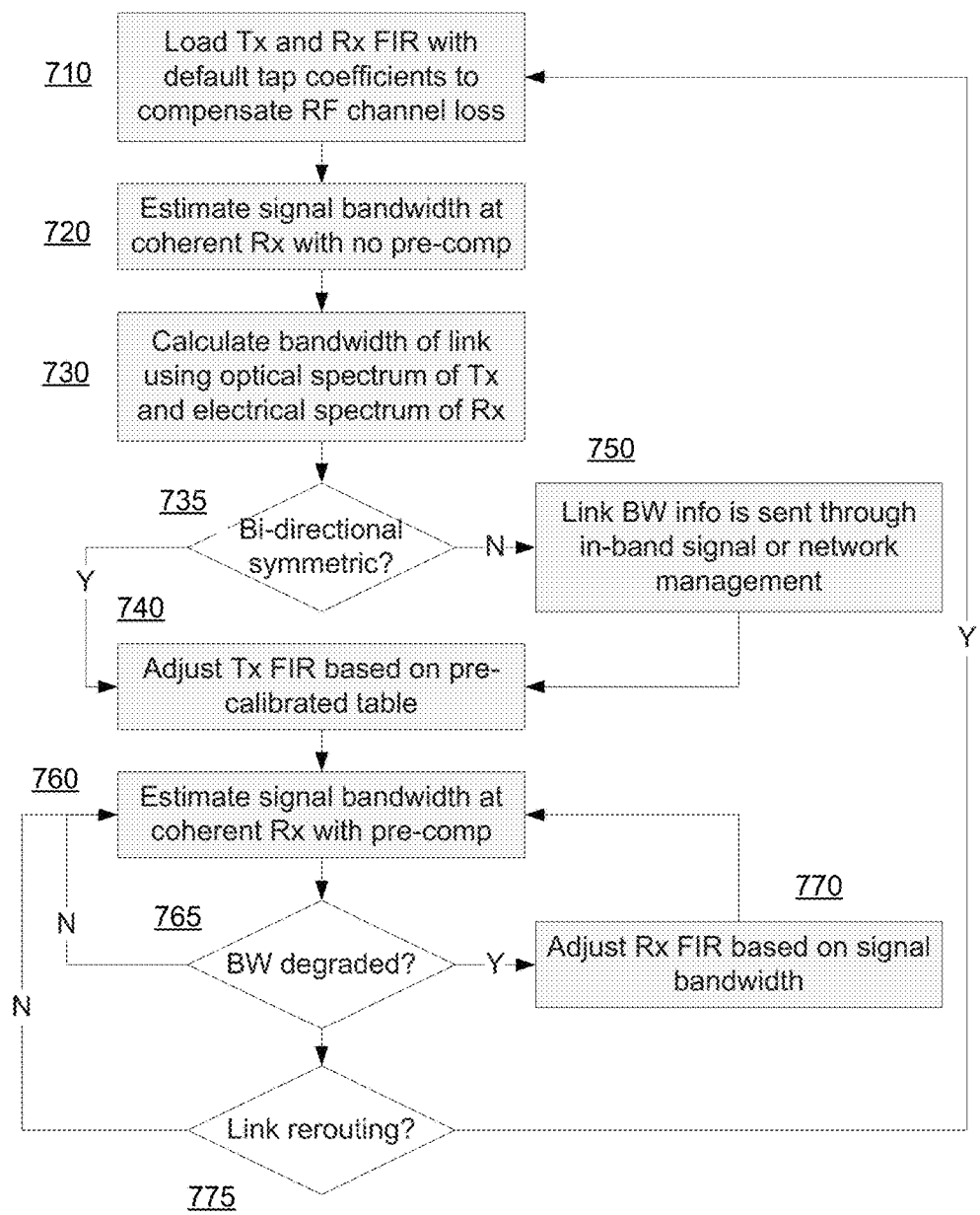
FIG. 7 illustrates a method of adaptive compensation for signal bandwidth narrowing using FIR filters in a coherent optical transceiver, according to embodiments.

FIG. 7 illustrates a method 700 of adaptive compensation for signal bandwidth narrowing using FIR filters in a coherent optical transceiver, according to embodiments. The method includes loading a transmitter FIR filter and a receiver FIR filter with default tap coefficients to compensate for the channel loss of RF traces, at 710. RF traces usually refer to print circuit board (PCB) traces connecting between DSP and coherent optics. Signals on RF traces are typically radio frequency signals. These signals can experience certain loss when propagating along the trace. Generally, a higher frequency of the propagating signal can lead to more losses.

At 720, the bandwidth of an analog signal after transmission in the channel is estimated. The FIR filter on the receiver-end can also be adaptively adjusted based on the estimated bandwidth. This initial compensation can be mainly for the channel loss of RF trace and other static effects that cause bandwidth narrowing. Without this pre-compensation, it can be challenging for the signal to reach the other end of the communication channel. At this step, some pre-compensation is carried out and the signal bandwidth is estimated. Then the estimated bandwidth information is used in subsequent steps to adaptively adjust the FIR filter to compensate for bandwidth narrowing due to the dynamic effect, such as bandwidth narrowing introduced by multiple ROADMs.

At 730, the optical spectrum of the transmitter signal is estimated based on calibration, and the electrical spectrum of the receiver signal is estimated based on FFT of ADC raw data. Based on the optical spectrum of the transmitter signal and the electrical spectrum of the receiver signal, the bandwidth of the link (e.g., the bandwidth of the degradation due to multiple ROADMs in the channel) is calculated.

At an indicator of 735, the type of the channel is detected. If the channel is bidirectional symmetric, the bandwidth of the link is fed back to the transmitter directly and the FIR filter on the transmitter can be adjusted based on the bandwidth of the link accordingly to a pre-calibrated table, at 740. If the channel is not bi-directional, the bandwidth information is sent to the transmitter FIR filter through in-band signal or a network management device, at 750, after which the transmitter FIR filter is adjusted accordingly, at 740.

At 760, the signal bandwidth is estimated at the receiver end. If bandwidth degradation is detected at 765, the method proceeds to 770, where the receiver FIR filter is adjusted based on the estimated signal bandwidth. The adjustment can also compensate any long-term drift and degradation. If no bandwidth degradation is detected at 765, the method proceeds to 775 to determine whether network rerouting happens. In an event of network rerouting determined at 775, this procedure can be repeated (i.e., the method 700 proceeds back to 710). On the other hand, in the absence of network rerouting determined at 775, the methods proceeds back to 760.

Figure 8:
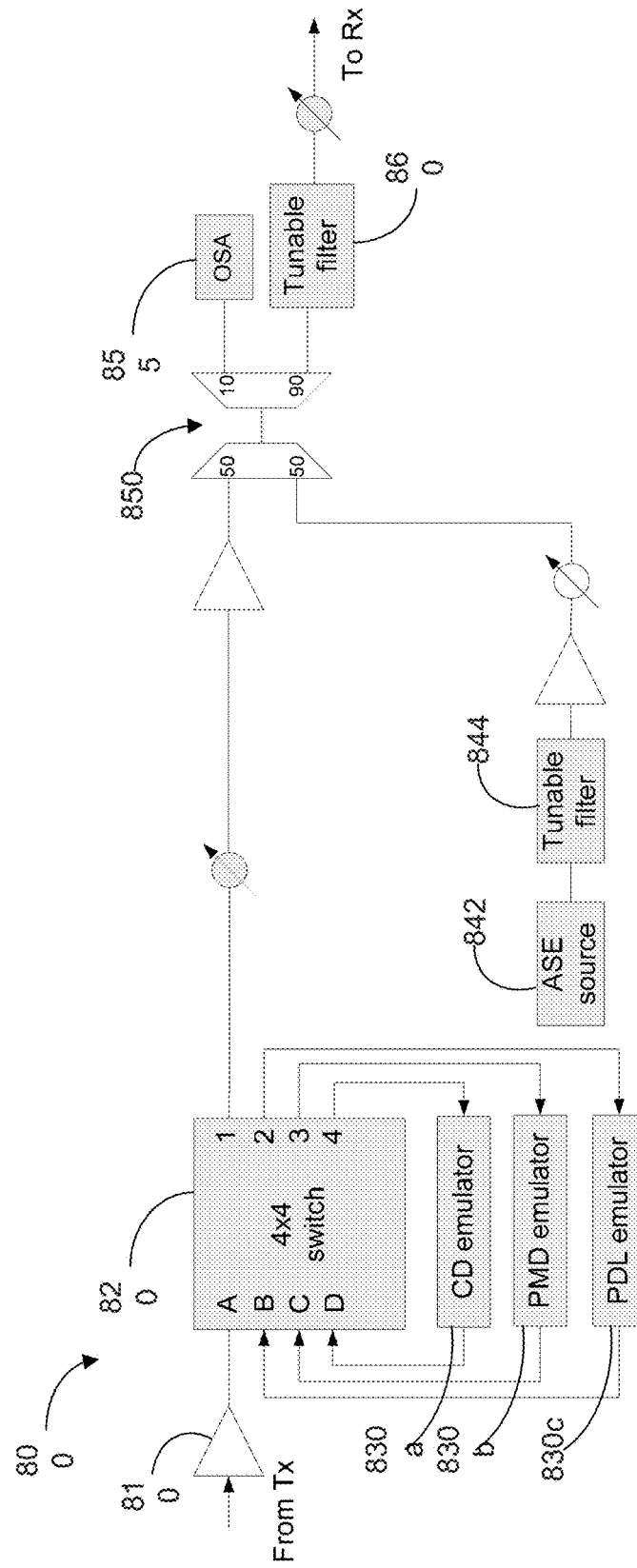
FIG. 8 shows a schematic of a system to characterize the techniques of adaptive compensation for signal bandwidth narrowing in a communication system, according to embodiments.

FIG. 8 shows a schematic of an example setup 800 for experimental characterization of techniques described herein for adaptive compensation of bandwidth narrowing. In particular, the setup 800 can be used to optimize tap coefficient for FIR filters under different impairments. The setup 800 includes a transmitter 810 (e.g., a class 1 CFP2-ACO transceiver running PM-QPSK modulation format) to provide an incident signal. The setup 800 also includes emulators 830 to simulate several types of impairments in the transmission system. These emulators 830 includes a CD emulator 830a, a PMD emulator 830b, and a PDL emulator 830c. A 4×4 non-blocking optical switches 820 can load either an individual simulated impairment or any combination of simulated impairments in the optical path from the emulators 830. After loading various impairments, the signal is combined with amplified spontaneous emission (ASE) noise, provided by an ASE source 842 noise and transmitted through a tunable filter 844, so as to change optical signal-to-noise ratio (OSNR) of the signal.

The signal loaded with various impairments and ASE is received by a coupler 850, which couples part of the received signal to a tunable optical filter 860 (also referred to as an optical filter here). An optical spectrum analyzer (OSA) 855 is operably coupled to the coupler 850 to measure the optical signal noise ratio. The optical filter 860 has tunable center frequency and pass-band and is placed in front of coherent receiver. By adjusting the pass-band of the optical filter 860, the impairment of receiver bandwidth narrowing can be emulated.

Figure 9B:
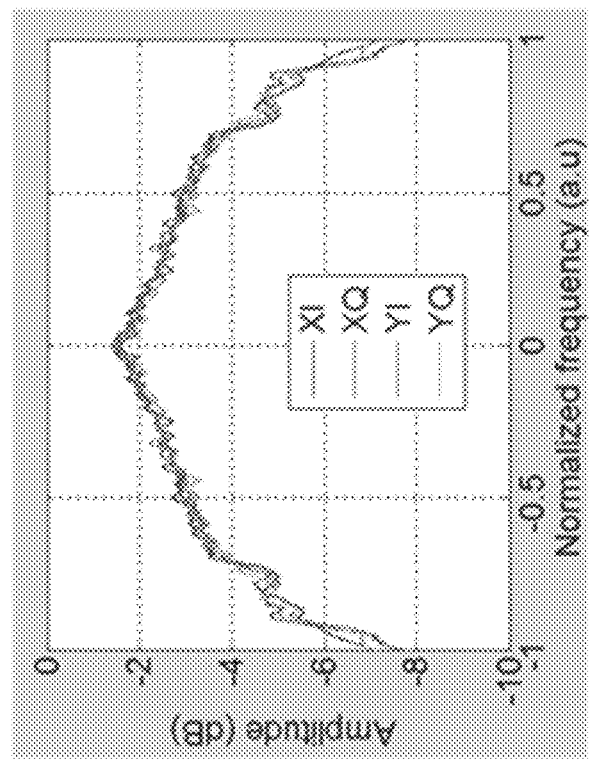
FIGS. 9A-9C show examples of experimental results of spectrum estimation using digital filtering in a communication system.
Figure 9A:
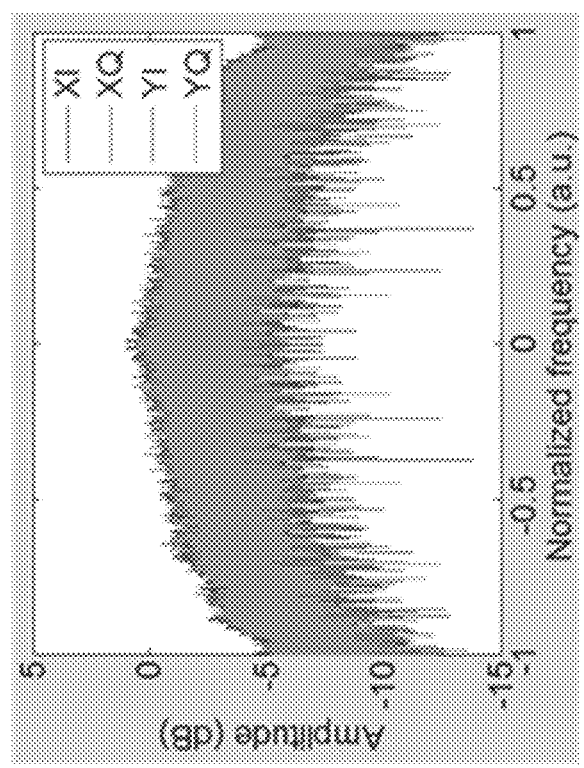
Figure 9C:
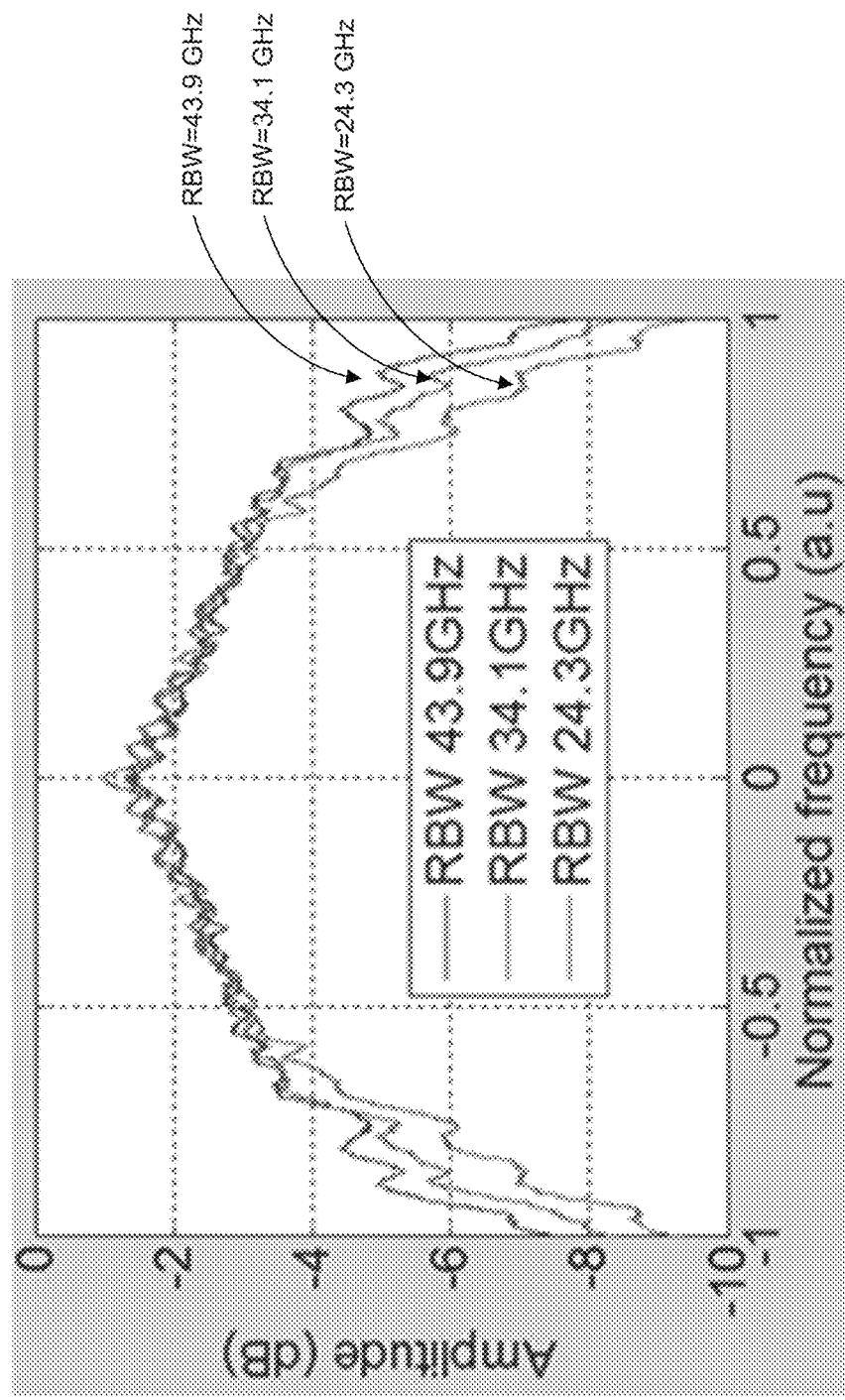

FIGS. 9A-9C show experimental results of spectrum and bandwidth estimation using digital filtering in a communication system. The estimated bandwidth can be then used for optimizing the tap coefficient of the optical filter 860. FIG. 9A shows spectra from ADC raw outputs. FIG. 9B shows spectra after Savitzky-Golay filtering. FIG. 9C shows spectra of XI tributary under different bandwidth of tunable filter with OSNR=14 dB. Modern optical communication system usually uses phase modulation. Signal can be coded in two orthogonal domains: in-phase (I) domain and quadrature (Q) domain. The communication system can also use two polarizations of light (i.e., X polarization and Y polarization). Thus there are 4 tributaries to carry data, XI, XQ, YI, and YQ. FIGS. 9A-9C show only XI tributary for clarification, but the data from other tributaries can be substantially similar.

In some embodiments, coherent DSP ASIC can provide a snapshot of ADC raw data. The spectrum of modulated signal can be obtained by performing a fast Fourier transform (FFT), as shown in FIG. 9A. The modulation in data, however, can make it challenging to estimate bandwidth. To address this issue, a Savitzky-Golay filter can be applied to the spectra generated by FFT. A Savitzky-Golay filter can improve signal-to-noise ratio with small distortion of signal. FIG. 9B shows the spectra (also referred to as the filtered spectra) after Savitzky-Golay filter.

The bandwidth of the optical tunable filter 860 in the setup 800 can be then adjusted to emulate the narrowing of signal bandwidth. The spectra of XI tributary under different bandwidth of tunable filter are shown in FIG. 9C. Three values of receiver bandwidth (i.e. 43.9 GHz, 34.1 GHz, 24.3 GHz) are presented in FIG. 9C.

To quantify the signal bandwidth, a parameter AttnNyquist can be defined as the difference between one spectrum's edge (at Nyquist frequency) and the spectrum's center:

$$Attn_{Nyquist} = P_{center} - P_{Nyquist}$$

The AttnNyquist can be further averaged over 4 tributaries to improve the accuracy. Physically, the attenuation at Nyquist frequency can be proportional to signal bandwidth and therefore can be used to quantify the signal bandwidth.

Figure 10:
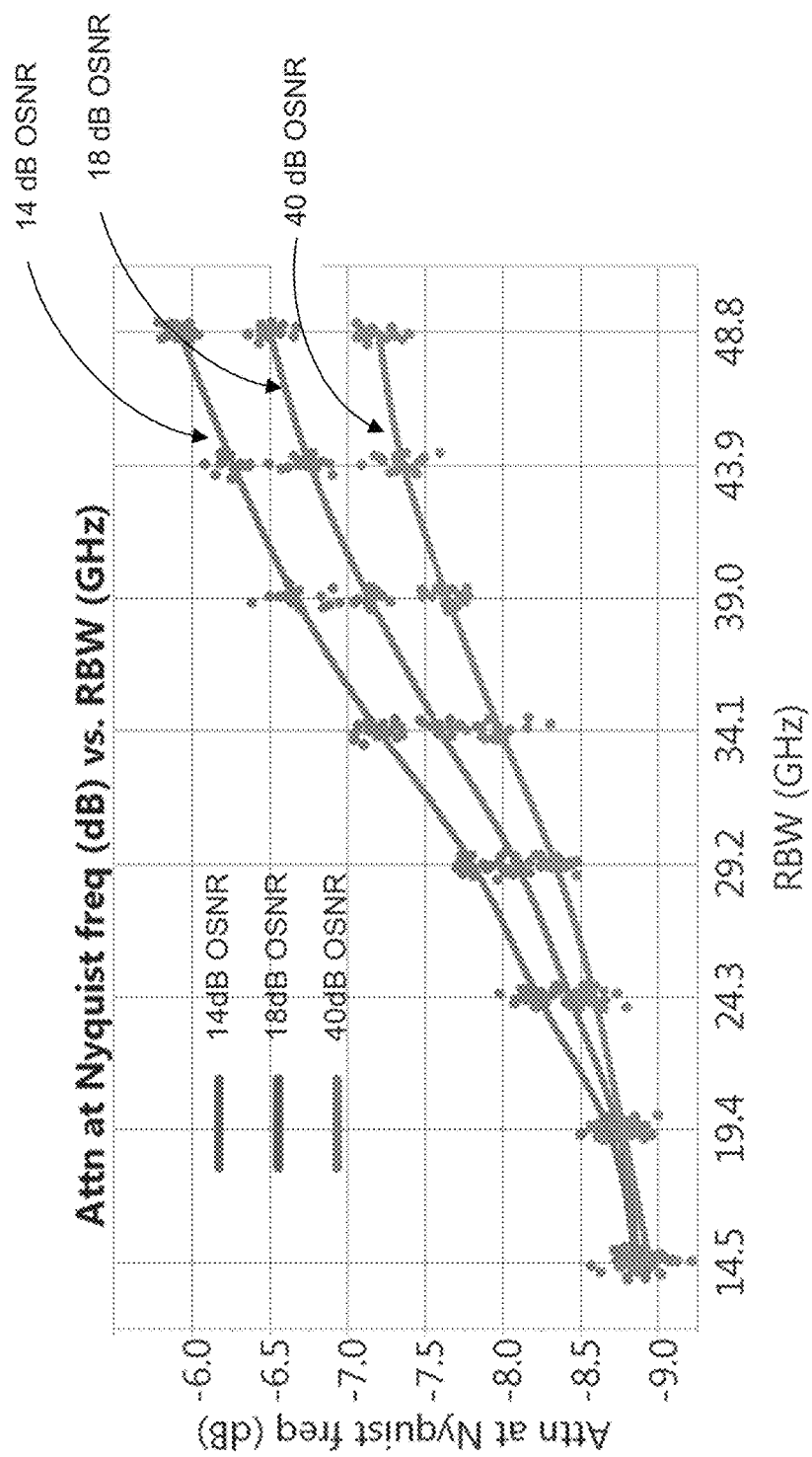
FIG. 10 shows examples of measured attenuation at Nyquist frequency as a function of receiver bandwidth in a coherent optical communication system.

FIG. 10 shows examples of attenuation at Nyquist frequency versus receiver bandwidth. For each bandwidth shown in FIG. 10, ADC raw data is recorded and attenuation at Nyquist frequency is calculated 16 times. FIG. 10 shows a roughly linear relationship between AttnNyquist and the signal bandwidth at the receiver. Small variation exists in AttnNyquist, so multiple measurements can be used to improve accuracy. Also AttnNyquist is dependent on OSNR level. In general, a lower OSNR can lead to a higher attenuation at Nyquist frequency.

It can be seen from FIG. 10 that the center of noise spectrum experiences much less loss than the edge of noise spectrum, which leads to increases of AttnNyquist. To distinguish different cases, one can use the pre-FEC BER for estimation of OSNR.

Figure 11:
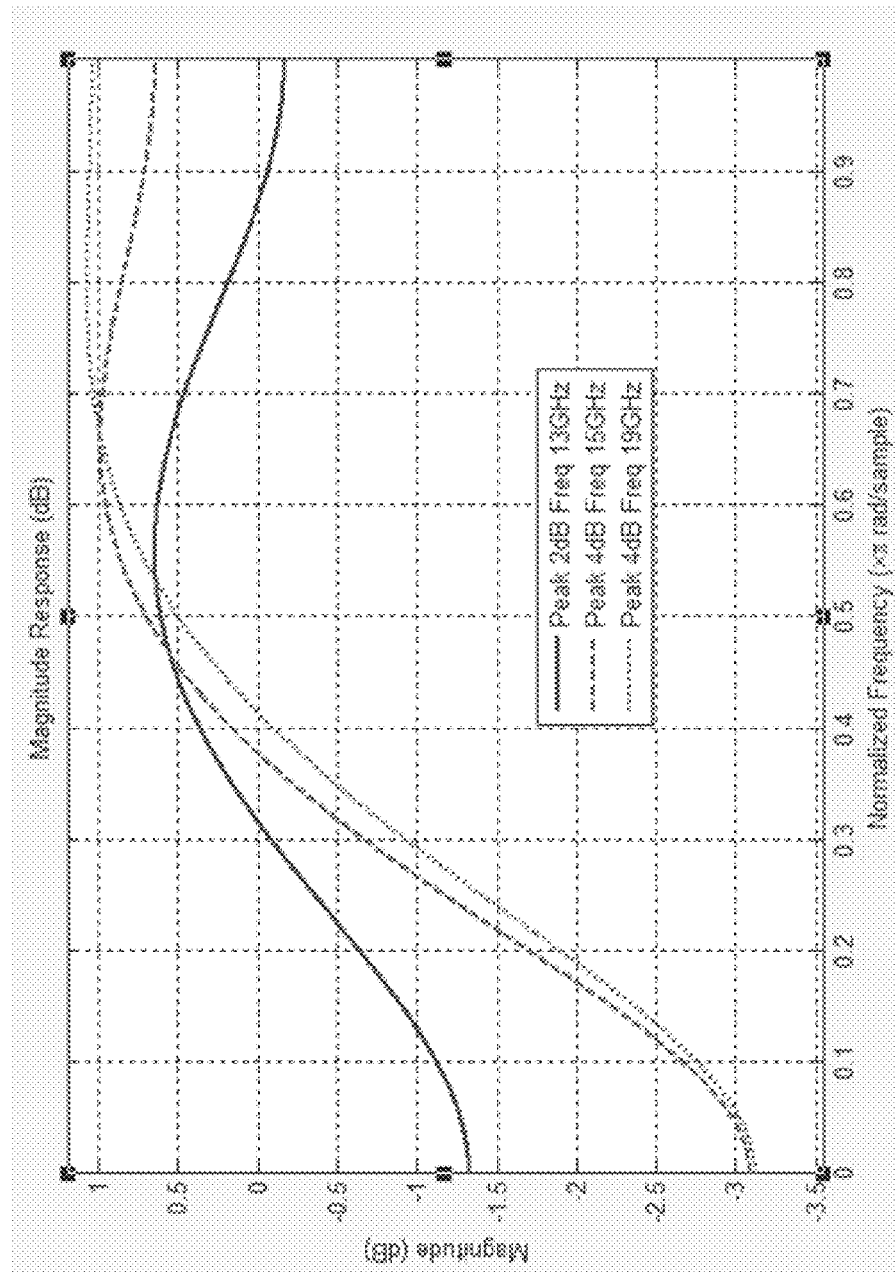
FIG. 11 shows examples of calculated magnitude response to different FIR filters that can be used for adaptive compensation of bandwidth narrowing.

FIG. 11 shows examples of magnitude response to different FIR filters that can be used in apparatus and methods described herein for adaptive compensation of bandwidth narrowing.

Figure 12:
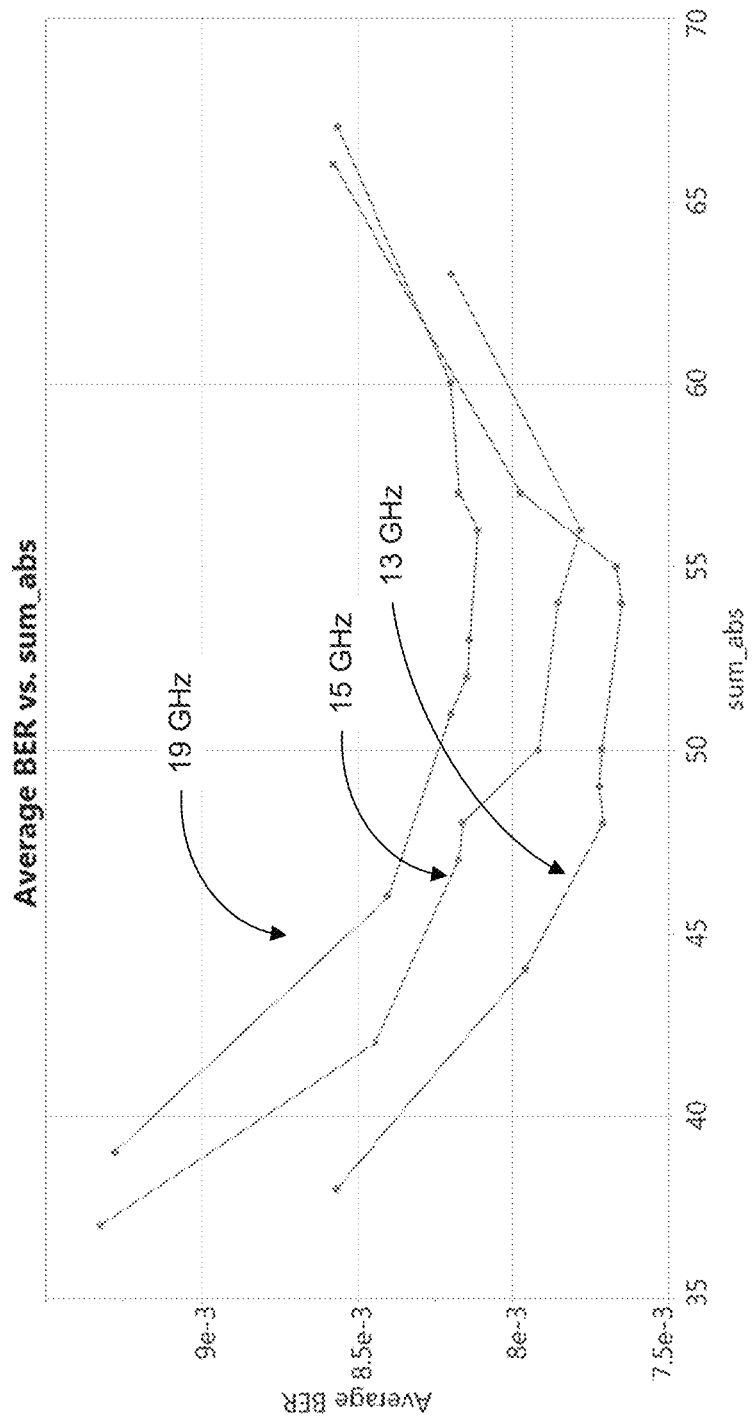
FIG. 12 shows examples of measured bit error rate versus signal gain of FIR filters that can be used for adaptive compensation of bandwidth narrowing

FIG. 12 shows examples of bit error rate versus signal gain of FIR filters that can be used in apparatus and methods described herein for adaptive compensation of bandwidth narrowing.

Four sets of FIR filters sharing the same tap coefficients are implemented in the coherent DSP chip. They are located after ADC and before frequency-domain CD compensation. The tap coefficients of the digital filter are real numbers only. Two parameters determine the shape of channel filters: peaking frequency and peaking amount, as shown in FIG. 11.

In addition, multiple sets of tap coefficients can satisfy the requirement for each filter shape. Then the gain of FIR filter, determined by summation of the absolute value of tap coefficients, can also become relevant. As shown in FIG. 12, a high gain can lead to signal being clipped, while a low gain can lead to signal being submerged from noise. As a result, it can be beneficial in general to find the optimal gain value for each filter. It is possible to compensate skew and imbalance among tributaries with different tap coefficients for each tributary channel.

Figure 13:
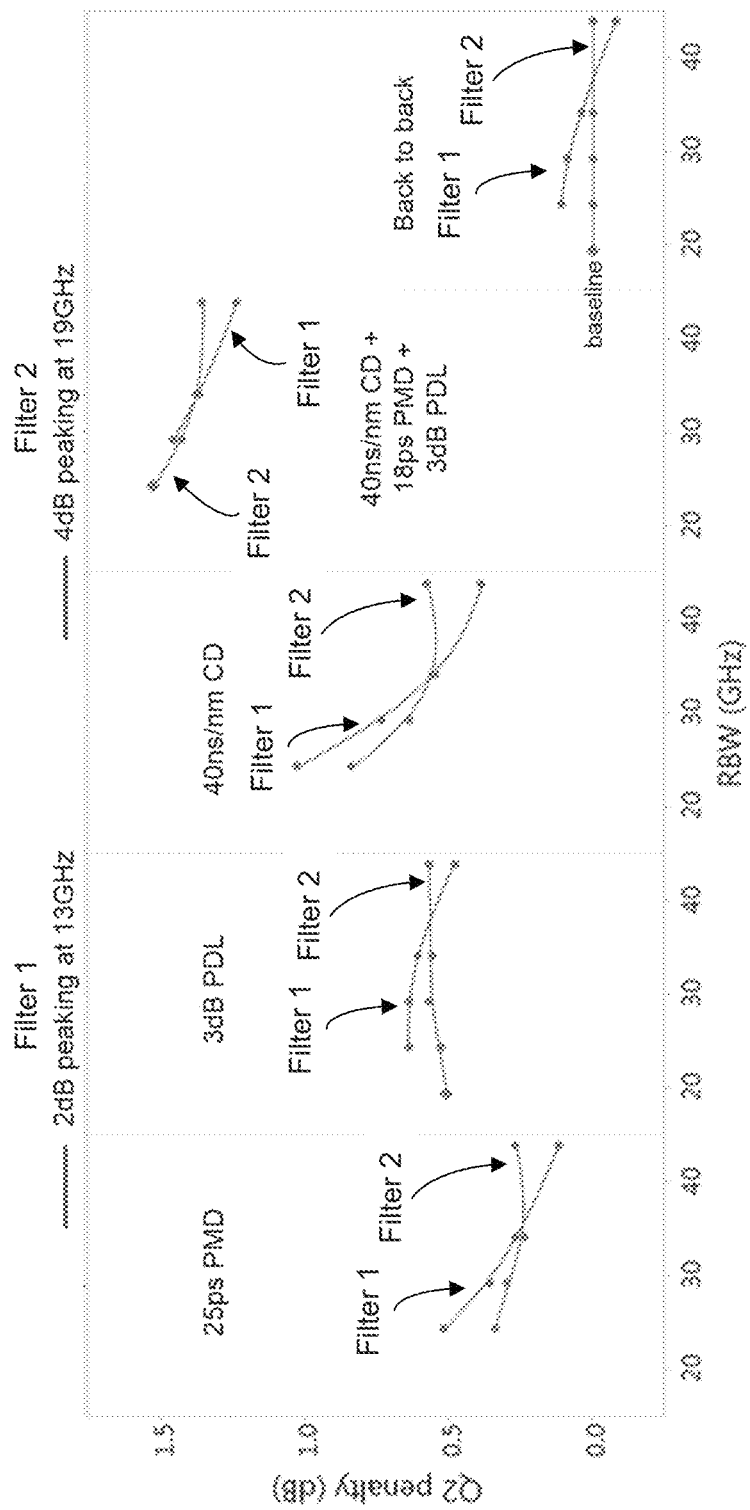
FIG. 13 shows examples of experimental results of Q2 penalty as a function of receiver bandwidth with different impairments loaded to the communication channel.

FIG. 13 shows examples of Q2 penalty as a function of receiver bandwidth with different impairments, OSNR=16 dB, and receiver optical power=−18 dBm. The back-to-back curve with 4 dB peaking at 19 GHz is used as the baseline in calculating Q2 penalty.

In general, the shape of the filter 860 can be inversely proportional to the signal for equalization (i.e. compensation) purpose. When the signal bandwidth is high, the optimal filter can have small peaking amplitude and small peaking frequency. Otherwise, more noise than signal can be amplified, thereby generating the net effect of amplifying noises. On the other hand, when the signal bandwidth is low, the optimal filter can have large peaking amplitude and large peaking frequency. In this way, the reduction of signal bandwidth can be compensated by adaptive FIR filter.

As seen in FIG. 13, the experimental results agree with theoretical analysis above. For example, the FIR filter with 2 dB peaking at 13 GHz performs better when the receiver bandwidth (RBW) is greater than 40 GHz. In another example, the FIR filter with 4 dB peaking at 19 GHz performs better when the RBW is less than 30 GHz. In the scenarios with 3 dB PDL, combined impairment (e.g., CD+PMD+PDL), and back-to-back, the lockable range (i.e., the range of frequencies at which the coherent receiver can recover digital data from the channel) of receiver with 4 dB peaking at 19 GHz (as shown in diamond symbol) is about 5 GHz larger than receiver with 2 dB peaking at 15 GHz. This can allow signal to pass more than 10 additional ROADMs.

Figure 14:
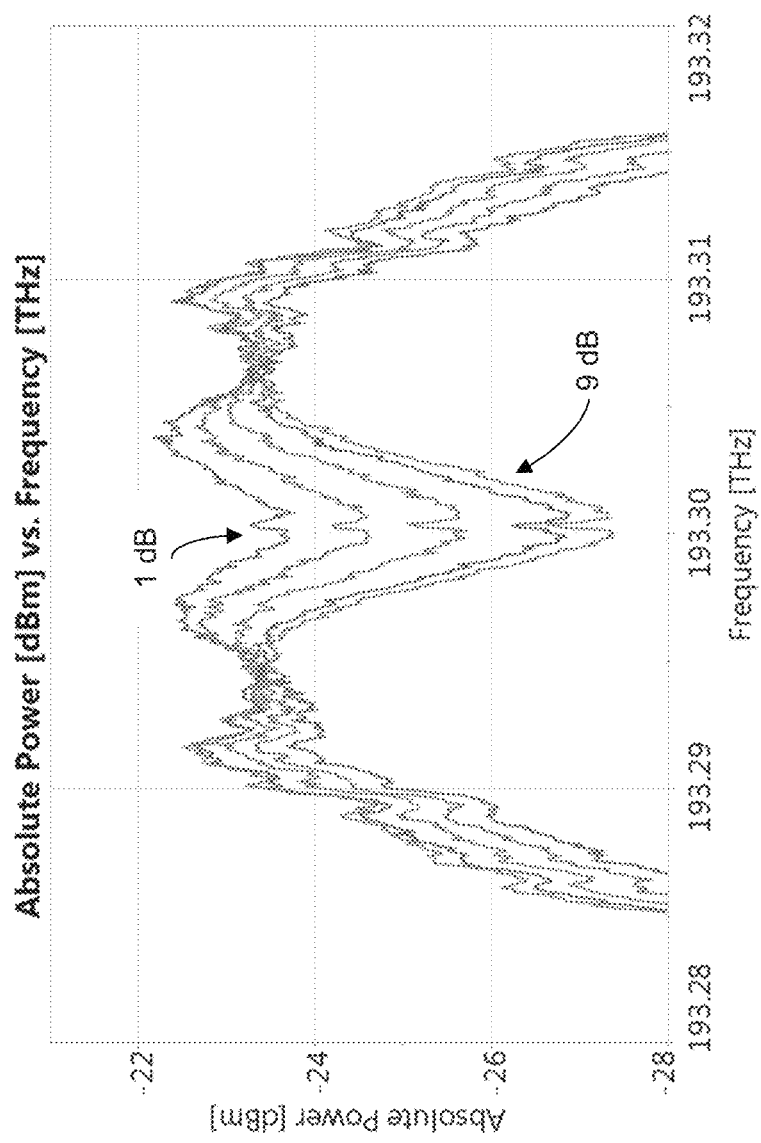
FIG. 14 shows examples of measured signal spectra under different peaking amplitudes of a transmitter FIR filter.
Figure 15:
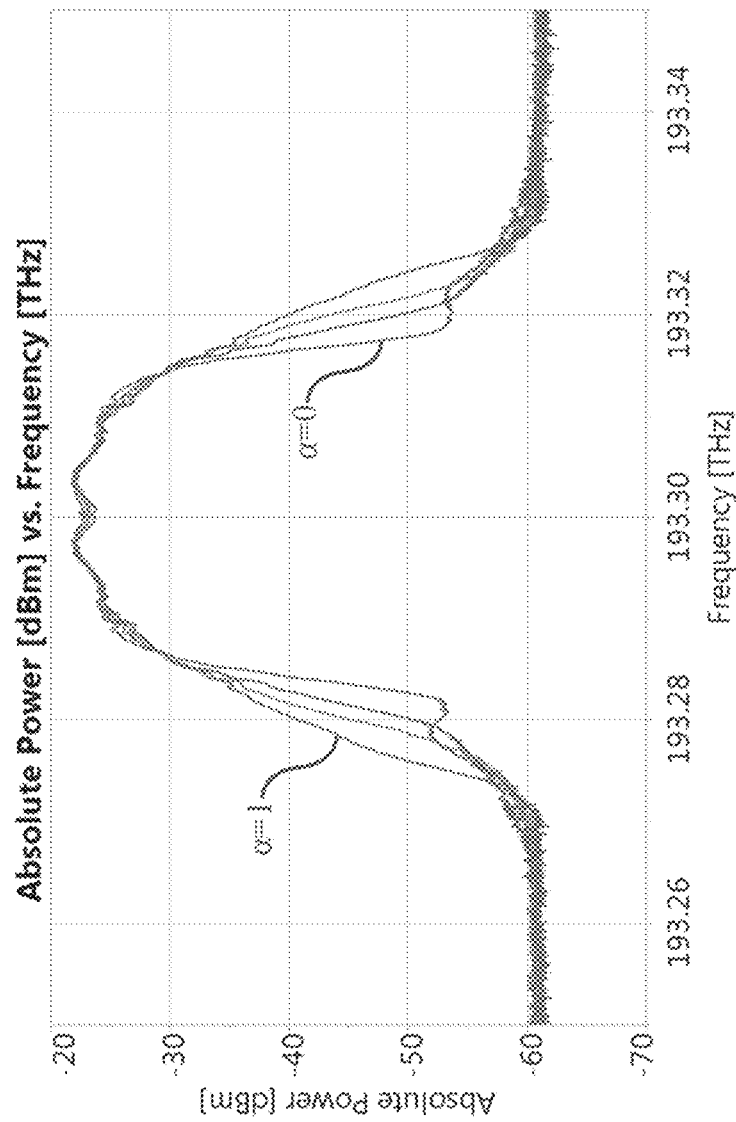
FIG. 15 shows examples of measured signal spectra under different roll-off factor α of a transmitter FIR filter.

FIG. 14 shows examples of measured signal spectra under different peaking amplitudes of an FIR filter. FIG. 15 shows measured signal spectra under different roll-off factor $\alpha$ of an FIR filter.

As discussed above, operating parameters for FIR filters (including both transmitter FIR filters and receiver FIR filters) include the peaking amplitude, the peaking frequency, and the roll-off factor. FIG. 14 shows the optical spectra with different peaking amplitudes and FIG. 15 shows optical spectra with different roll-off factors which are the coefficients for raised-cosine function. As seen, transmitter FIR filters can allow great capability and flexibility for pre-compensation of bandwidth narrowing effect. In general, with bandwidth narrowing, one can increase the peaking amplitude, increase the peaking frequency, and reduce the roll-off factor. One can potentially adjust the parameters above simultaneously.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
   a finite impulse response (FIR) filter to receive a digital signal; and
   a transmitter, operatively coupled to the FIR filter, to transmit an analog signal, converted from the digital signal, to a communication channel,
   the FIR filer configured to change at least one operating parameter based on a bandwidth of the analog signal after transmission in the communication channel,
   the bandwidth of the analog signal being estimated, using an estimator, based at least in part on raw sampling data generated by an analog-to-digital converter (ADC) operatively coupled to the transmitter.

2. The apparatus of claim 1, wherein the transmitter includes at least one of a C-form pluggable generation 2-analog coherent optics (CFP2-ACO) transmitter coupled with a digital signal processor (DSP) chip through a pluggable interface or a coherent in-phase/quadrature transmitter integrated together with the DSP within a physical module.

3. The apparatus of claim 1, wherein at least one operating parameter changed by the FIR filter includes at least one of a peaking frequency or a peaking amplitude of the FIR filter.

4. The apparatus of claim 1, wherein:
   the at least one operating parameter changed by the FIR filter includes at least one of a peaking frequency or a peaking amplitude of the FIR filter; and
   the FIR filter is configured to decrease at least one of the peaking frequency or the peaking amplitude in response to the bandwidth of the analog signal greater than a predetermined value.

5. The apparatus of claim 1, wherein the FIR filter includes a raised-cosine filter configured to decrease a roll-off factor of the raised-cosine filter in response to the bandwidth of the analog signal less than a predetermined value.

6. The apparatus of claim 1, wherein the estimator is configured to:
   perform Fourier transform of the raw ADC data to generate unfiltered spectrum;
   perform digital filtering to the unfiltered spectrum to generate filtered data; and
   estimate the bandwidth of the analog signal based on the filtered data.

7. The apparatus of claim 1, wherein the estimator is configured to:
   perform Fourier transform of the raw ADC data to generate unfiltered spectrum;
   perform at least one of Savitzky-Golay filtering or moving average filtering to the unfiltered spectrum to generate filtered data; and
   estimate the bandwidth of the analog signal based on the filtered data.

8. The apparatus of claim 1, wherein the FIR filter is configured to receive, via a network management device, a control signal based on the bandwidth of the analog signal to change the at least one operating parameter.

9. The apparatus of claim 1, wherein the FIR filter is configured to receive, via an in-band signal, a control signal based on the bandwidth of the analog signal to change the at least one operating parameter.

10. The apparatus of claim 1, wherein the FIR filter is a first FIR filter, the ADC is configured to convert the analog signal into a second digital signal, the apparatus further comprising:
    a second FIR filter, operatively coupled to the ADC, to receive the second digital signal, the second FIR filter configured to change a second operating parameter based at least in part on the bandwidth of the analog signal.

11. A method, comprising:
    transmitting a digital signal through a finite impulse response (FIR) filter;
    converting the digital signal, after the FIR filter, into an analog signal;
    transmitting the analog signal to a communication channel using a transmitter; and
    changing at least one operating parameter of the FIR filter based on a bandwidth of the analog signal after transmission in the communication channel, the bandwidth being estimated, using an estimator, based at least in part on raw sampling data generated by an analog-to-digital converter (ADC) operatively coupled to the transmitter.

12. The method of claim 11, wherein changing the at least one operating parameter of the FIR filter includes changing at least one of a peaking frequency or a peaking amplitude of the FIR filter.

13. The method of claim 11, wherein changing the at least one operating parameter of the FIR filter includes at least one of:
    decreasing at least one of a peaking frequency or a peaking amplitude of the FIR filter in response to the bandwidth of the analog signal greater than a predetermined value; or
    increasing at least one of the peaking frequency or the peaking amplitude of the FIR filter in response to the bandwidth of the analog signal smaller than a predetermined value.

14. The method of claim 11, wherein:
    transmitting the digital signal through the FIR filter includes transmitting the digital signal through a raised-cosine filter; and
    changing at least on operating parameter of the FIR filter includes at least one of:
        decreasing a roll-off factor of the raised-cosine filter in response to the bandwidth of the analog signal less than a predetermined value; or
        increasing the roll-off factor of the raised-cosine filter in response to the bandwidth of the analog signal greater than a predetermined value.

15. The method of claim 11, wherein estimating the bandwidth of the analog signal includes:
    performing Fourier transform of the raw ADC data to generate unfiltered spectrum;
    performing digital filtering to the unfiltered spectrum to generate filtered data; and
    estimate the bandwidth of the analog signal based on the filtered data.

16. The method of claim 11, wherein estimating the bandwidth of the analog signal includes:
performing Fourier transform of the raw ADC data to generate unfiltered spectrum;
performing at least one of Savitzky-Golay filtering or moving average filtering to the unfiltered spectrum to generate filtered data; and
estimating the bandwidth of the analog signal based on the filtered data.

17. The method of claim 11, further comprising:
transmitting a control signal to the FIR filter, via a network management device, to change the at least one operating parameter of the FIR filter, the control signal being generated based on the bandwidth of the analog signal.

18. The method of claim 11, further comprising:
transmitting a control signal to the FIR filter, via an in-band signal, to change the at least one operating parameter of the FIR filter, the control signal being generated based on the bandwidth of the analog signal.

19. The method of claim 11, wherein the FIR filter is a first FIR filter, the method further comprising:
converting the analog signal into a second digital signal using the ADC;
transmitting the second digital signal through a second FIR filter; and
changing a second operating parameter of the second FIR filter based at least in part on the bandwidth of the analog signal.

20. A bi-directional link, comprising:
a first FIR filter to receive a digital signal;
a digital-to-analog converter (DAC), operatively coupled to the first FIR filter, to convert the digital signal to an analog signal;
a transmitter, operatively coupled to the DAC, to transmit the analog signal to a communication channel;
a receiver, operatively coupled to the transmitter, to receive the analog signal after the communication channel;
an ADC, operatively coupled to the receiver, to generate raw sampling data representative of the analog signal;
an estimator, operatively coupled to the ADC and the first FIR filter, to estimate a bandwidth of the analog signal based at least in part on the raw sampling data; and
a second FIR filter operatively coupled to the ADC and the estimator,
the first FIR filter and the second FIR filter being configured to decrease a peaking frequency and a peaking amplitude the first FIR filter and the second FIR filter in response to the bandwidth of the analog signal greater than a predetermined value.

* * * * *